Dec. 30, 1969     S. J. BEYERS ET AL     3,486,744
FLAME CUTTING INSTALLATION WITH FLUID
FLOW WASTE REMOVAL MEANS
Filed Jan. 2, 1968
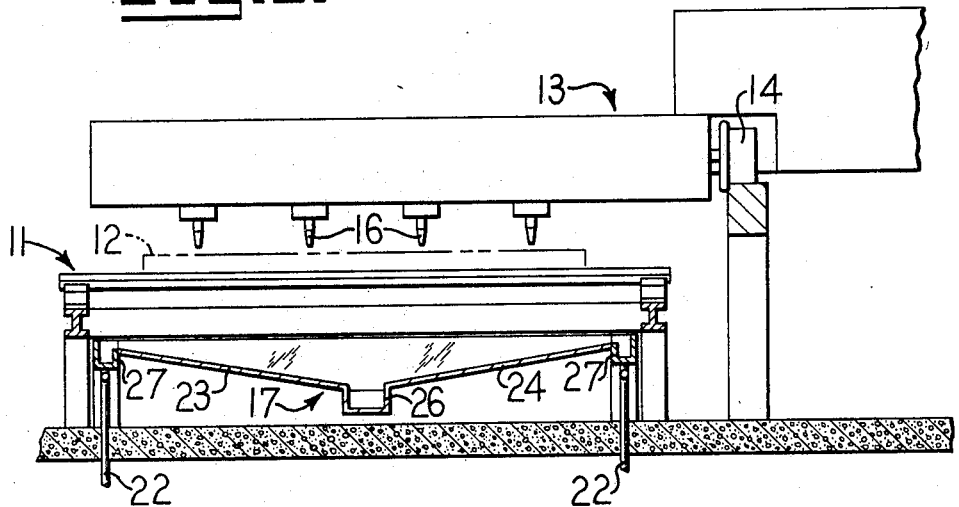
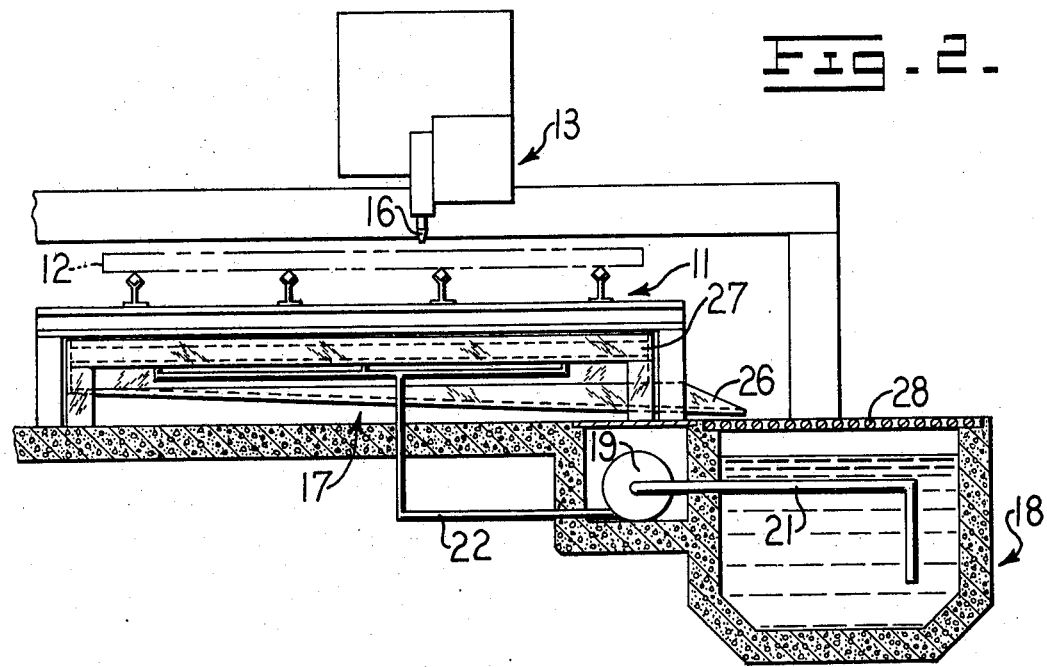
INVENTORS
STEPHEN J. BEYERS
ALFRED A. DRAEGER
ERNEST GODWIN
BY
ATTORNEYS

United States Patent Office 3,486,744
Patented Dec. 30, 1969

3,486,744
FLAME CUTTING INSTALLATION WITH FLUID FLOW WASTE REMOVAL MEANS
Stephen J. Beyers, Aurora, Alfred A. Draeger, Warrenville, and Ernest Godwin, Oswego, Ill., assignors to Caterpillar Tractor Co., Peoria, Ill., a corporation of California
Filed Jan. 2, 1968, Ser. No. 694,908
Int. Cl. B23k 7/10; B08b 15/00
U.S. Cl. 266—23                    4 Claims

ABSTRACT OF THE DISCLOSURE

A flame cutting installation, having a flame cutting mchine with cutting torches mounted to traverse steel plate stock, includes an inclined trough beneath the path of the cutting torches, a collection or settling pit at the lower end of the trough and a pump for recirculating water from the settling pit to the upper end of the trough during a cutting operation. Water flow during the cutting operation entraps oxide particles and carries away slag to reduce air pollution and facilitate slag removal.

---

A typical flame cutting installation as a flame cutting machine with multiple torches mounted to traverse metal stock such as steel plate. The torches are directed downwardly toward the metal to cut it into desired shapes. The cutting operation results in a considerable amount of metallic cutting waste which is a source of problems to be alleviated by the present invention. Small oxide particles are produced mostly in the form of sparks, which tend to become airborne and pollute the air. The pollution is irritating to persons in the area and tends to reduce working efficiency. Molten metal is also produced during the cutting process and drops to the floor where it further increases the temperature around the cutting installation and thus has the same undesirable effect on operator comfort and efficiency as does the oxide pollution. Further, the molten metal tends to cool and form slag so that additional time and expense is required for its periodic removal.

To overcome these problems, the present invention provides a flame cutting installation wherein a constant flow of coolant is to be maintained beneath the torches and metal stock during the cutting operation to receive the cutting waste. The constant flow of coolant is provided particularly for the purpose of entrapping small particles which would otherwise tend to become airborne and result in pollution about the installation. It is also a particular purpose to provide a constant flow of coolant in sufficient quantity to carry away molten metal in the form of slag.

To illustrate the effectiveness of the novel flame cutting installation provided by the present invention, such an installation was tested and found to reduce the amount of iron oxide emitted into the air around the installation by as much as 85%.

Additional objects and advantages of the present invention will be apparent from the following description having reference to the accompanying drawing.

In the drawing:

FIGS. 1 and 2 are respectively a end view and a side view in elevation, with parts in section, of a flame cutting installation embodying the present invention.

A flame cutting installation as illustrated in FIGS. 1 and 2 has a frame 11 for supporting metal stock such as a steel plate 12. To cut the steel plate into desired shapes such as strips, a flame cutting machine 13 is mounted for transversal over the plate as by rollers, one of which is indicated at 14. The machine 13 has a plurality of flame cutting torches 16 directed downwardly toward the steel plate to be in cutting interaction therewith during traversal.

The above components are of a type employed in conventional flame cutting installations. However, in such prior art installations, metallic waste from the cutting operation is permitted either to fall to the floor or become airborne with the undesirable effects described above.

The present invention provides an inclined trough 17 under the steel plate and the traversing paths of the flame cutting torches. A collection or settling pit 18 is disposed at the lower end of the inclined trough. A recirculating pump 19 is in communication with the settling pit and the trough by means of conduits 21 and 22 respectively to return cooling water from the settling pit to the trough and maintain a constant flow cooling water across the trough during cutting operations.

The trough 17 is formed by panels 23 and 24 which slope inwardly from th sides of the cutting frame to be joined with a central sluice 26 which slopes downwardly along the length of the cutting frame toward the settling pit 18. An inlet 27 is provided at each side of the trough 17 and along its full length to provide a uniform flow of cooling water across the surfaces of the inclined panels 23 and 24.

During cutting operations, molten metal falls downwardly from the steel plates and iron oxide particles or sparks tend to be directed downwardly also by the flame from the torches. The panels 23 and 24 are sufficiently close to the steel plate so that the constant flow of water thereover entraps a substantial portion of the particles before they can escape into the air. Additionally, the quantity of water flowing over the plates 23 and 24 is sufficient, according to the recirculating pump 19, to cool the molten metal, convert it to slag and carry it to the central sluice 26 from where it passes to the settling pit.

The settling pit performs two important functions during the cutting operation. It serves as a collecting point for the slag and other cutting waste. In addition, it serves as a source of cooling water to be recirculated by the pump 19. Recirculated cooling water must be at a suitable temperature and sufficiently free of entrained cutting waste so that it will properly receive additional cutting waste during its passage through the trough 17. To perform both these functions, the settling pit 18, as illustrated in FIG. 2, has a substantial capacity so that the slag and other cutting waste tends to settle to the bottom. The relatively large mass of water tends to insure a suitable temperature of water to be recirculated by the pump 19. A grate or screen 28 is placed over the settling pit to remove larger pieces of cutting waste, particularly slag, from the cooling water.

Numerous modifications are possible within the scope of the present invention, particularly as to the collection pit 18. For example, the pit may be elongated to serve a bank of similar flame cutting installations. In addition, where such an elongated pit is employed, a conveyor could be disposed along the floor of the pit to collect slag from the various installations. Also, instead of merely relying on the capacity of the pit 28 to provide suitable water for recirculation, a separate circulating system (not shown) could be provided to remove water from the collection pit, pass it through suitable cooling and filter means before returning it to the settling pit or recirculating pump.

We claim:

1. In a flame cutting installation with a flame cutting machine having at least one torch directed downwardly for cutting of metal stock therebeneath, the improvement comprising a trough disposed under the torches and stock for supporting a continuous flow of coolant fluid therebeneath, the trough being sufficiently close to the torches to enable said fluid to entrap a substantial portion of small metallic waste particles which would otherwise tend to become airborne during cutting operations, collection means for receiving fluid flow from the trough, and recirculating means for drawing a predetermined quantity of said fluid from the collection means and recycling it to the trough to provide a constant flow of coolant under the torches and metal stock during cutting operation, the constant flow of coolant being sufficient to receive metal cutting waste from the cutting operation, reduce air pollution about the installation and facilitate removal of the waste products.

2. The installation of claim 1 wherein the flame cutting machine comprises a plurality of torches and is mounted for traversal of the metal stock, the trough being suitably sloped to maintain a constant flow of coolant under the traversing path of the torches.

3. The installation of claim 1 wherein said collection means has means for accumulation of cutting waste.

4. The installation of claim 1 wherein the collection means is a settling pit and the coolant is water.

References Cited

UNITED STATES PATENTS

| | | | |
|---|---|---|---|
| 2,442,013 | 5/1948 | Mott et al. | 148—9 X |
| 3,123,455 | 3/1964 | Paasche | 210—167 X |
| 3,411,518 | 11/1968 | Fisher et al. | 134—104 X |

ROBERT D. BALDWIN, Primary Examiner

U.S. Cl. X.R.

134—104